G. A. ANDERSON.
CAR TRUCK.
APPLICATION FILED JAN. 13, 1921.
1,414,915.
Patented May 2, 1922.
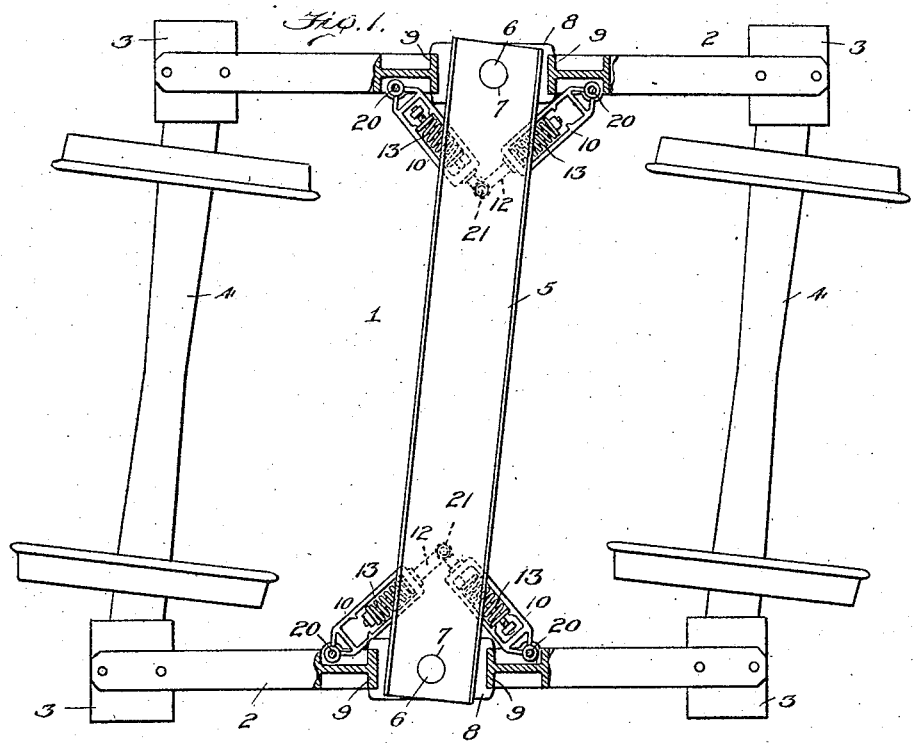
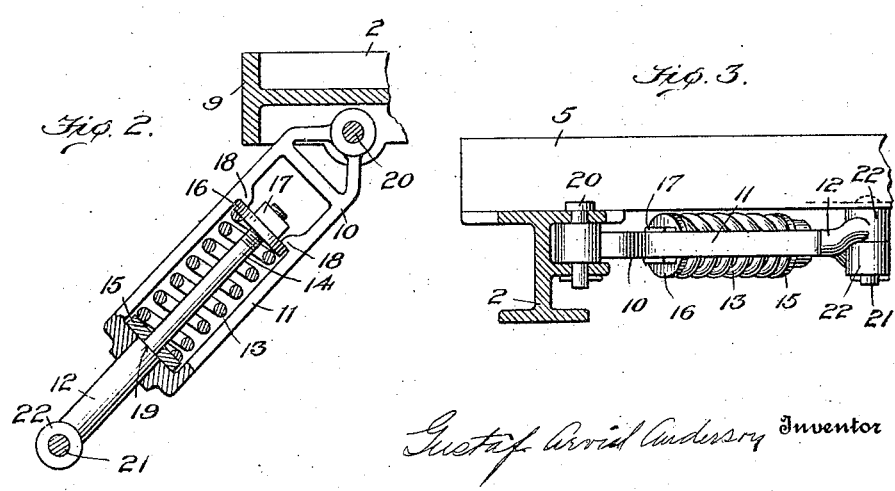

UNITED STATES PATENT OFFICE.

GUSTAF ARVID ANDERSON, OF BALTIMORE, MARYLAND, ASSIGNOR TO THE T. H. SYMINGTON COMPANY, OF NEW YORK, N. Y., A CORPORATION OF DELAWARE.

CAR TRUCK.

1,414,915.   Specification of Letters Patent.   Patented May 2, 1922.

Application filed January 13, 1921. Serial No. 437,060.

*To all whom it may concern:*

Be it known that I, GUSTAF ARVID ANDERSON, a citizen of the United States, residing at Baltimore, in the State of Maryland, have invented certain new and useful Improvements in Car Trucks; and I do hereby declare the following to be a full, clear, and exact description of the invention, such as will enable others skilled in the art to which it appertains to make and use the same.

My invention relates to car trucks and more particularly to a type of truck wherein the side frame members on opposite sides of the truck are connected in a manner permitting them to execute a yieldingly resisted relative movement longitudinally of the truck, thereby minimizing the shocks and strains transmitted to the truck structure incident to its passage around curves, over switch points or because of irregularities in the track or the truck wheels.

Car trucks now in service are of two classes, namely, rigid trucks and flexible trucks. In rigid trucks the side frame members thereof are rigidly connected by a member or members extending between the side frames. In this type of truck therefore the side frames are incapable of any appreciable movement relative to each other longitudinally of the track without imparting great deforming strains to the truck parts and especially to the connections between the side frames, and it results therefore that much trouble is experienced in keeping the bolts and rivets tight and breakage of the side frames frequently occurs. This form of truck is advantageous, however, in that because of the inability of its side frames to move longitudinally of the track with respect to each other, the axles are maintained substantially at right angles to the side frames and the binding of the truck wheels in the gage of the track on curves is thereby decreased. In trucks of the flexible type relative longitudinal movement of the side frame members is freely permitted to the full extent of flexibility the truck is designed to possess. This unrestrained relative movement of the side frames relieves those members and the truck parts with which they are connected of the severe shocks to which they would be subjected in service if rigidly united and thereby reduces breakage of truck parts and lessens the rate of truck deterioration, but these advantages are attained at the expense of high train resistance and severe wheel flange and rail wear incident to binding of the truck wheels upon the rails.

One of the primary objects of my invention, broadly stated, is to provide means for resiliently resisting the forces which tend to change the normal angular relation between the side frames and the truck axles, said means being adapted to restore the parts to their normal positions when the distorting or deforming forces cease to act.

Another principal object of the invention is to provide means affording a yielding resistance to relative longitudinal displacement of the truck side frames which shall increase as the relative movement of the side frames progresses from normal position.

A still further object of the invention is to provide efficient yielding means constantly tending to maintain the truck in square.

There are other features of invention, residing in particular features of construction and combinations of elemental parts, all as will hereinafter appear.

In the drawings which have been chosen for the purpose of illustrating the principle of the invention, the scope whereof is pointed out in the claims:—

Figure 1 is a view, partly in plan and partly in horizontal section, of a car truck embodying the invention, the bolster, which is such as is ordinarily employed in flexible trucks, being omitted and the parts being illustrated in the angular relations they assume in passing around a curve, the angular relation of the parts being exaggerated in order the more clearly to illustrate the invention.

Figure 2 is a fragmentary detail view, partly in plan and partly in section, of a portion of the side frame and one of the devices for yieldingly maintaining the truck in square.

Figure 3 is a side elevation, partly in section, of a portion of one of the side frame members showing the relation of one of the yielding truck squaring mechanisms thereof.

In the preferred form of my invention illustrated in the drawings, the truck 1 is provided with side frame members 2 each of which carries at its opposite ends the usual form of journal box 3; and in the journal boxes are located the journal ends of the truck axles 4. The side frame members 2 are connected crosswise of the truck by a member 5 which permits the side frames to move relatively to each other longitudinally of the truck. This cross connecting member may be and preferably is in the form of a spring plank which is pivotally connected at its opposite ends to the respective side frames 2 by means of vertically extending pivot bosses formed on the latter and entering correspondingly shaped apertures or pivot bearings 7 in the spring plank. If desired the ends of the cross connecting means 5 may project into the bolster openings 8 of the side frames between the columns 9, sufficient clearance being provided, as in the case of the bolster, to permit the cross connecting member 5 to turn through the required angle with respect to the side frames without coming into contact with or binding upon the latter.

Operatively interposed between the cross connecting member or spring plank 5 and the side frame members 2 are resilient means offering yielding resistance to relative longitudinal displacement of the side frame members from their normal position or the square position of the truck. The resilient means preferably comprises a plurality of yielding mechanisms 10 interposed between and operatively connected to the cross connecting member 5 and the respective side frames 2. While it is preferred to interpose these yielding mechanisms between each side frame member 2 and the adjacent end portion of the spring plank 5, it is obvious that this is merely a matter of choice since the yielding mechanisms may cooperate with the cross connecting member 5 and with a single side frame.

Each of the yielding mechanisms 10 is preferably positioned below the spring plank and may conveniently be formed with a cage 11 and with a follower mechanism 12 which is movable with respect to the cage to compress a spring 13 located within the latter. The follower mechanism 12 has a shouldered stem 14 upon which is slidably mounted a follower plate 15 that bears against one end of the spring. The opposite end of the spring 13 is engaged by a similar follower plate 16 which likewise is slidably mounted upon the shouldered stem 14 and which is maintained on the latter by means of a nut 17. When the spring 13 is in normal position, corresponding to the square position of the truck, the follower 15 is seated upon one end of the cage 11 and the follower 16 bears against stop shoulders or flanges 18 upon the cage. It results from this construction that the spring 13 is double acting, that is to say, if the shouldered stem 14 is pulled outwardly from the cage 11 the follower 16 will move with said stem while the follower 15 will remain seated upon the cage, the spring 13 thereby being compressed between said followers. If, on the other hand, the relative movement of the shouldered stem 14 and cage member 11 is such as to cause the said stem to move into the cage, the shoulder 19 of the stem displaces the follower 15 from its seat upon the cage and causes it to move towards the follower 16, which latter remains at rest upon the shoulders 18 of the cage. This approach of the followers compresses the spring 13. Both springs 13 which are operatively connected to a side frame member 2 are therefore simultaneously energized by the longitudinal displacement of the neighboring side frame member in either direction from its normal position. The springs 13 are preferably of such length that when assembled within the respective spring cages 11 they are under an initial or preliminary compression. This preliminary compression of the springs serves to offer a substantial resistance to the distortion of the truck and at the same time ensures the return of the frame members to normal position after the force causing their displacement from normal is withdrawn.

The cross connecting means 5 through which the side frames 2 are attached is preferably provided at each end with two of the yielding mechanisms 10, each of said mechanisms being disposed at an angle to each other and being connected to the adjacent truck frame member 2 on opposite sides of the neighboring pivot boss 6. By this arrangement the yielding mechanisms 10 exert upon the side frame member 2 in an effective and efficient manner a force couple acting about the axis of the pivot boss 6.

Each of the yielding mechanisms 10 is movably connected to the truck frame preferably by means of pivot pins 20 and the connection between said mechanisms 10 and the spring plank or cross connecting member 5 may be readily effected by a single pivot pin 21 for each pair of yielding mechanisms. In order to employ the single pivot pin 21 for operatively connecting a pair of spring mechanisms 10 to the spring plank 5 the outer ends of the plungers of the follower mechanisms 12 may be fashioned with pivot collars 22 which are offset so that their apertures may be brought into alinement to receive the pivot pin. It will be seen that when the springs 13 of the several yielding mechanisms 10 have been energized as a result of relative longitudinal movement of the side frame members 2 of the truck from normal position, the cross connecting member 5 is subjected to a force couple which will cause it to be returned to normal position upon cessation of the track resistance by which the relative longitudinal movement of the truck frame members was produced. The return of the cross connecting member 5 to normal position effects the restoration of the side frame members 2 to normal position.

The devices by which the truck members are yieldingly retained in the normal or square position are of a nature permitting them to be so located that they are well protected from accidental injury and do not interfere with other necessary parts with which trucks are commonly provided.

When a truck constructed in accordance with my invention is subjected to a force causing one side frame to advance with reference to the opposite side frame, the springs 13 carried by the cages 11 of the yielding mechanisms 10 will be compressed as soon as the distorting force overcomes the predetermined initial compression of the springs. The position assumed by the parts upon being subjected to such a distorting force will be clearly understood from an examination of Fig. 1. The amount of compression of the springs 13 will, of course, be dependent upon the intensity of the force operating to displace the side frames 2 from their normal relation. It will be apparent that immediately upon any diminution of the distorting force the side frames 2 and cross connecting member 5 will move toward normal position and that they will completely reassume such normal position when the distorting force disappears.

I claim:—

1. In a car truck, the combination with transversely spaced side frame members which are relatively movable longitudinally of the truck, of means movably connecting said side frame members intermediate the ends thereof and adapted to be turned angularly with respect thereto upon a relative longitudinal displacement of said side frame members, and resilient means affording yielding resistance to longitudinal separation of said side frame members, said resilient means being adapted to be energized by said connecting means upon a longitudinal separating movement of said side frame members.

2. In a car truck, the combination with transversely spaced side frame members which are relatively movable longitudinally of the truck, of rotatable means movable with respect to said side frame members for connecting the latter, and spring means operatively interposed between said connecting means and at least one of said side frame members for resisting longitudinal separation of said side frames.

3. In a car truck, the combination with transversely spaced side frame members which are relatively movable longitudinally of the truck, of means movable with respect to said side frame members for connecting the latter, and spring means for resisting longitudinal separation of said side frame members, said spring means being operatively interposed between said connecting means and the respective side frame members.

4. In a car truck, the combination with transversely spaced side frame members which are relatively movable longitudinally of the truck, of means extending crosswise of the truck and intermediate the ends of said side frame members for movably connecting said side frame members, and resilient means acting on said connecting means for resisting a departure from the normal angular relation of said connecting means and side frame members.

5. In a car truck, the combination with transversely spaced side frame members which are relatively movable longitudinally of the truck, of a member extending crosswise of the truck for movably connecting said side frame members, and resilient means operatively interposed between said connecting member and side frame members for resisting departure of said connecting member and side frame members from normal angular relation.

6. In a car truck, the combination with side frame members which are relatively movable longitudinally of the truck, of means movably connected to said side frame members and adapted to change its angular relation thereto when said side frames move longitudinally with respect to each other, and yielding means arranged on opposite sides of said connecting means for resisting a change in the angular relation of said connecting means and said side frame members when said side frame members execute a relative longitudinal movement in departure from their normal relation.

7. In a car truck, the combination with side frame members which are relatively movable longitudinally of the truck, of a cross member connected to said side frame members intermediate the ends thereof and pivotally movable with respect to said side frame members, and means for yieldingly resisting change in the normal angular relationship of said side frame members and said cross connecting member.

8. In a car truck, the combination with oppositely disposed side frame members which are pivotally connected so as to permit them to have relative movement longitudinally of the truck, of means acting upon said side frame members and interposed between the same for yieldingly opposing relative longitudinal movement of the latter in departure from their normal relation.

9. In a car truck, the combination with side frame members which are relatively movable longitudinally of the truck, of means movably connected to said side frame members and adapted to change its angular relation with respect thereto, and means operatively interposed between said means and said side frame members for applying a force couple to said means causing it to move toward normal position after having been displaced from normal angular relation to said side frame members as a result of relative longitudinal movement of the latter.

10. In a car truck, the combination with side frame members which are relatively movable longitudinally of the truck, of a spring plank movably connected to said side frame members, and means located below said spring plank for yielding resisting relative longitudinal displacement of said side frame members from normal position.

11. In a car truck, the combination with side frame members which are relatively movable longitudinally of the truck, of a spring plank movably connected to said side frame members, and a plurality of yielding means located below said spring plank and respectively interposed between said spring plank and said side frame members for yieldingly resisting relative longitudinal displacement of said side frame members from normal position.

12. In a car truck, the combination with side frame members which are relatively movable longitudinally of the truck, of a spring plank movably connecting said side frame members, and means interposed between said spring plank and at least one of said side frame members for resisting relative longitudinal displacement of said side frames from normal position.

13. In a car truck, the combination with side frame members which are relatively movable longitudinally of the truck, of a spring plank pivotally connected to said side frame members, and means interposed between said spring plank and the respective side frame members for yieldingly resisting relative longitudinal displacement of said side frame members from normal position.

14. In a car truck, the combination with side frame members which are relatively movable longitudinally, of means extending crosswise of the truck for movably connecting said side frame members, and a plurality of springs disposed at an angle to each other and operating to resist relative longitudinal displacement of said side frame members from normal position, said springs being located intermediate the ends of said frame members.

15. In a car truck, the combination with side frame members which are relatively movable longitudinally, of means for connecting said members and a plurality of springs disposed at an angle to each other and operating to resist relative longitudinal displacement of said side frame members from normal position, said springs being adapted to extend on opposite sides of said connecting means.

16. In a car truck, the combination with side frame members which are relatively movable longitudinally, of means for movably connecting said side frame members, and spring means interposed between said side frame members and extending at an angle to said connecting means and to at least one of said side frame members and operating to resist relative longitudinal displacement of said side frames from normal position.

17. In a car truck, the combination with side frame members which are relatively movable longitudinally of the truck, of means connecting said side frame members across the truck, and spring mechanism connected to said connecting means and acting upon at least one of said side frame members at a plurality of spaced points.

18. In a car truck, the combination with side frame members which are relatively movable longitudinally of the truck, of a member extending across the truck and pivotally connecting said side frame members, and spring mechanism operatively connected to said cross connecting member and acting upon the adjacent side frame member on opposite sides of said pivot.

19. In a car truck, the combination with side frame members which are relatively movable longitudinally of the truck, of means extending crosswise of the truck and pivotally connected to said side frame members, and yielding means operatively interposed between said connecting means and at least one of said side frame members for exerting upon said side frame member a force couple acting about the point of pivotal connection of said connecting means and side frame member.

20. In a car truck, the combination with side frame members which are relatively movable longitudinally of the truck, of a spring plank connected to said side frame members, and spring means located between said side frame members and connected to said spring plank for resisting relative longitudinal displacement of said side frame members from normal position.

21. In a car truck, the combination with side frame members which are relatively movable longitudinally of the truck, of means extending crosswise of the truck and movably connecting said side frame members and adapted to change its angular relation horizontally with respect to said side frame members, and spring means resisting relative longitudinal displacement of said side frame members from normal position, said spring means being normally energized and assembled under a predetermined compression.

22. In a car truck, the combination with side frame members which are relatively movable longitudinally of the truck, of a spring plank pivotally connected at its opposite ends to each of said side frame members, and means operatively interposed between said spring plank and one of said frame members for resisting relative rotation of said frame member and spring plank from normal position.

23. In a car truck, the combination with side frame members which are relatively movable longitudinally of the truck, of a spring plank pivotally connected at its opposite ends to each of said side frame members, and diagonally arranged yielding means interposed between said plank and at least one of said frame members for resisting the rotation of said side frame member on said spring plank, said means being adapted yieldingly to maintain said spring plank and said side frame member in a predetermined position.

24. In a car truck, the combination with side frame members which are relatively movable longitudinally of the truck, of means extending crosswise of the truck and movably connecting said side frame members, and means including a double acting spring for resisting relative longitudinal displacement of said side frame members from normal position, said spring being energized by the longitudinal displacement of one of said side frame members in either direction from its normal position.

25. In a car truck, the combination with side frame members which are relatively movable longitudinally of the truck, of a spring plank pivotally connected to said side frame members at its opposite ends, and spring means interposed between said spring plank and at least one of said side frame members, said spring means being adapted to be energized by a relative rotation of said side frame member and spring plank in either direction from normal position.

26. In a car truck, the combination with side frame members which are relatively movable longitudinally of the truck, of a spring plank pivotally connected to said side frame members, and spring means constantly tending to maintain said spring plank and side frame members in normal relation, said spring means being pivotally connected to said spring plank and side frame members.

27. In a car truck, the combination with side frame members which are relatively movable longitudinally of the truck, of a spring plank movably connecting said side frame members, and means for yieldingly resisting relative longitudinal displacement of said side frame members from normal position, said means including a spring interposed between relatively movable members one of which is connected to said spring plank and one of which is movable by one of said side frame members.

28. In a car truck, the combination with side frame members which are relatively movable longitudinally of the truck, of a spring plank movably connecting said side frame members, and means for yieldingly resisting relative longitudinal displacement of said side frame members from normal position, said means including a cage, follower mechanism, and a spring within said cage adapted to be energized by the relative movement of said cage and follower mechanism.

29. In a car truck, the combination with spaced side frame members, of means for operatively connecting the same, and resilient means carried by one of said side frame members and bearing upon said connecting means for resisting longitudinal displacement of the opposite side frame member from normal position.

30. In a car truck, the combination with transversely spaced side frame members, of means movably connected to said side frame members, and means interposed between said connecting means and one of said side frame members tending to move said side frame members in opposite directions longitudinally of the truck toward normal position when either of said side frame members is displaced longitudinally from normal position.

31. In a car truck, the combination with transversely spaced side frame members, of means movably connected to said side frame members intermediate the ends thereof, and means tending to move said side frame members in opposite directions longitudinally of the truck toward normal position when either of said side frame members is displaced longitudinally from normal position.

32. In a car truck, the combination with side frame members which are relatively movable longitudinally of the truck, of means for connecting said side frame members intermediate the ends thereof, and means for yieldingly maintaining said side frame members in normal position, said means including a spring which is adapted to be energized by a movement of at least one of said side frame members upon the longitudinal displacement of said frame member in either direction from its normal position.

33. In a car truck, the combination with freely movable rigid side frame members, of car axles spanning said side frame members and unconnected therewith, means connecting said side frame members adapted to permit relative longitudinal movemnet of said side frame members from normal position, and means for yieldingly maintaining said side frame members in normal position.

34. In a car truck, the combination with relatively movable side frame members, of a spring plank pivotally connecting said side frame members intermediate the ends thereof, said spring plank being adapted to permit relatively longitudinal movement of said side frame members from normal position, and means operable against said side frame members for yieldingly maintaining said side frame members in normal position.

35. In a car truck, the combination with transversely spaced side frame members, of a spring plank pivotally connecting said side frame members and adapted to permit relative longitudinal movement of said side frame members from normal position, and means for resisting displacement movement of the side frame members from normal position, said means being located intermediate the ends of the side frame members.

36. In a car truck, the combination with oppositely disposed movable side frame members, of a spring plank pivotally connecting said side frame members and adapted to permit relative longitudinal movement of said side frame members from normal position, car axles spanning said side frame members, and means for yieldingly resisting longitudinal displacement movement of the side frame members from normal position, said means being located between the said car axles and side frame members and adapted to restore the side frame members to normal position upon cessation of the forces producing displacement.

37. In a car truck, the combination with relatively movable side frame members, of a spring plank movably connecting said side frame members, and squaring mechanism for said truck, said mechanism including yieldable means assembled under initial compression for exerting a force capable of maintaining the side frame members in normal square relation and adapted to be energized when said initial compression is overcome for rapidly restoring the side frame members to normal square position.

In testimony whereof I affix my signature.

GUSTAF ARVID ANDERSON.